(12) United States Patent
Inoue et al.

(10) Patent No.: US 8,020,656 B2
(45) Date of Patent: Sep. 20, 2011

(54) COOLING CONDUIT ARRANGEMENT FOR HYBRID VEHICLE WITH TWO RADIATORS

(75) Inventors: Yukari Inoue, Toyota (JP); Sachio Kiduka, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/003,093

(22) PCT Filed: Jun. 30, 2009

(86) PCT No.: PCT/IB2009/006311
§ 371 (c)(1),
(2), (4) Date: Jan. 7, 2011

(87) PCT Pub. No.: WO2010/004422
PCT Pub. Date: Jan. 14, 2010

(65) Prior Publication Data
US 2011/0114402 A1 May 19, 2011

(30) Foreign Application Priority Data

Jul. 8, 2008 (JP) ................................. 2008-178088

(51) Int. Cl.
*B60K 11/04* (2006.01)
(52) U.S. Cl. ..................................................... 180/68.4
(58) Field of Classification Search ................. 180/68.4, 180/65.21, 65.22, 232, 274; 280/784; 296/35.2, 296/187.03, 187.04, 193.09, 203.2
See application file for complete search history.

(56) References Cited

U.S. PATENT DOCUMENTS

| 4,367,793 | A | * | 1/1983 | MacIntosh | 165/151 |
| 4,541,645 | A | * | 9/1985 | Foeldesi | 180/68.4 |
| 4,662,432 | A | * | 5/1987 | Suzuki | 165/41 |
| 5,271,473 | A | | 12/1993 | Ikeda et al. | |
| 5,341,871 | A | * | 8/1994 | Stelzer | 165/121 |
| 5,492,167 | A | * | 2/1996 | Glesmann | 165/41 |
| 5,566,748 | A | | 10/1996 | Christensen | 165/67 |
| 6,048,288 | A | * | 4/2000 | Tsujii et al. | 477/5 |
| 6,073,594 | A | * | 6/2000 | Tsukiana et al. | 123/41.33 |
| 6,166,498 | A | * | 12/2000 | Yamaguchi et al. | 318/34 |
| 6,323,613 | B1 | * | 11/2001 | Hara et al. | 318/471 |
| 6,422,182 | B1 | * | 7/2002 | Ohta | 123/41.29 |

(Continued)

FOREIGN PATENT DOCUMENTS

EP   1 726 470 A1   11/2006

(Continued)

OTHER PUBLICATIONS

Office Action issued Dec. 15, 2009, in Japan Patent Application No. 2008-178088, filed Jul. 8, 2008 (with English translation).

(Continued)

*Primary Examiner* — J. Allen Shriver, II
*Assistant Examiner* — Jacob Meyer
(74) *Attorney, Agent, or Firm* — Oblon, Spivak, McClelland, Maier & Neustadt, L.L.P.

(57) ABSTRACT

An inflow conduit through which coolant flows into a hybrid radiator that is arranged in front of an engine radiator is arranged on an upper portion of a bumper reinforcement and attached to the front of the hybrid radiator. As a result, damage to the inflow conduit can be inhibited and the coolant can be cooled by running air before it is cooled in the hybrid radiator.

5 Claims, 2 Drawing Sheets

U.S. PATENT DOCUMENTS

| | | | |
|---|---|---|---|
| 6,450,275 B1 * | 9/2002 | Gabriel et al. | 180/65.23 |
| 6,470,961 B1 * | 10/2002 | Case | 165/78 |
| 6,513,579 B1 * | 2/2003 | Kent et al. | 165/67 |
| 6,516,906 B2 * | 2/2003 | Sasano et al. | 180/68.4 |
| 6,609,558 B1 * | 8/2003 | Charbonnelle | 165/67 |
| 6,668,956 B1 * | 12/2003 | Pelage et al. | 180/68.4 |
| 6,675,921 B2 * | 1/2004 | Brown | 180/68.4 |
| 7,044,246 B2 * | 5/2006 | Fujieda | 180/68.4 |
| 7,284,594 B2 * | 10/2007 | Sanada et al. | 165/41 |
| 7,347,464 B2 * | 3/2008 | Tanabe | 293/4 |
| 7,610,973 B2 * | 11/2009 | Asao et al. | 180/65.21 |
| 7,766,112 B2 * | 8/2010 | Kapadia et al. | 180/68.4 |
| 7,814,963 B2 * | 10/2010 | Adamson et al. | 165/41 |
| 2002/0157885 A1 * | 10/2002 | Brown | 180/68.4 |
| 2003/0168270 A1 * | 9/2003 | Maeda et al. | 180/68.4 |
| 2004/0104007 A1 * | 6/2004 | Kolb | 165/41 |
| 2004/0211607 A1 * | 10/2004 | Sasano et al. | 180/68.4 |
| 2005/0274507 A1 * | 12/2005 | Sanada et al. | 165/202 |
| 2007/0144713 A1 * | 6/2007 | Sugimoto et al. | 165/140 |
| 2007/0240923 A1 * | 10/2007 | Matsushima et al. | 180/68.4 |
| 2008/0017429 A1 * | 1/2008 | Palande et al. | 180/68.4 |
| 2008/0308333 A1 * | 12/2008 | Kapadia et al. | 180/68.4 |
| 2010/0025127 A1 * | 2/2010 | Oyobe | 180/65.22 |
| 2010/0078149 A1 * | 4/2010 | Yoshimitsu et al. | 165/67 |
| 2010/0121508 A1 * | 5/2010 | Murata et al. | 701/22 |
| 2011/0067942 A1 * | 3/2011 | Takei | 180/291 |

FOREIGN PATENT DOCUMENTS

| | | |
|---|---|---|
| JP | 64-016922 U | 1/1989 |
| JP | 2003-312275 A | 11/2003 |
| JP | 2003 320856 A | 11/2003 |
| JP | 2005-271795 A | 10/2005 |
| JP | 2008-24200 A | 2/2008 |

OTHER PUBLICATIONS

International Search Report mailed May 10, 2010 in PCT/IB2009/006311 filed Jun. 30, 2009.

Written Opinion of the International Searching Authority mailed May 10, 2010 in PCT/IB2009/006311 filed Jun. 30, 2009.

* cited by examiner

COOLING CONDUIT ARRANGEMENT FOR HYBRID VEHICLE WITH TWO RADIATORS

BACKGROUND OF THE INVENTION

1. Field of the Invention

The invention relates to a hybrid vehicle. More particularly, the invention relates to a hybrid vehicle in which an internal combustion engine, an electric motor, an internal combustion engine radiator that performs heat exchange between coolant that cools the internal combustion engine and air, and an electric motor radiator that performs heat exchange between coolant that cools the electric motor and an inverter that drives the electric motor, are all housed in a compartment in a front portion of a vehicle.

2. Description of the Related Art

Japanese Patent Application Publication No. 2008-24200 (JP-A-2008-24200) describes a hybrid vehicle which is provided with both an engine and an electric motor as power sources, and in which a hybrid vehicle radiator, which cools an inverter that drives the electric motor, and an engine radiator are housed in an engine compartment (an engine room). In this hybrid vehicle, an air-conditioning condenser is arranged in front of and below the engine radiator, and the hybrid vehicle radiator is arranged above the air-conditioning condenser. A supply conduit that supplies coolant to the hybrid vehicle radiator is arranged on the upper portion of the air-conditioning condenser in front of the hybrid vehicle radiator and is attached to the hybrid vehicle radiator from the front.

In the hybrid vehicle described above, the supply conduit is attached to the hybrid vehicle radiator from the front, which improves the mountability and assemblability of equipment and members behind the hybrid vehicle radiator compared with when the supply conduit is attached to the hybrid vehicle radiator from the back. However, with this arrangement, the supply conduit may be damaged in the event of a vehicle collision. For example, if a member that forms part of the vehicle body, such as a bumper reinforcement, is forced toward the rear and presses against the supply conduit, the supply conduit may become damaged.

SUMMARY OF THE INVENTION

This invention provides a hybrid vehicle which inhibits a conduit for a radiator which carries coolant that cools an inverter and an electric motor housed in a compartment in a front portion of the vehicle from becoming damaged.

A first aspect of the invention relates to a hybrid vehicle that includes an internal combustion engine; an electric motor; an inverter that drives the electric motor; a compartment that houses the internal combustion engine, the electric motor, and the inverter in a front portion of the vehicle; an internal combustion engine radiator which is arranged near the front-most portion of the compartment and in generally the center in the vehicle width direction, and which performs heat exchange between coolant that cools the internal combustion engine and outside air; an internal combustion engine radiator conduit through which the coolant that cools the internal combustion engine flows and which is arranged behind the internal combustion engine radiator in the longitudinal direction of the vehicle, one end of the internal combustion engine radiator conduit being attached to the internal combustion engine radiator; a bumper that is arranged at the front end of the vehicle; a reinforcement which extends in the vehicle width direction behind the bumper in the longitudinal direction of the vehicle; an electric motor radiator which is arranged behind the reinforcement and in front of the internal combustion engine radiator in the longitudinal direction of the vehicle, and which performs heat exchange between coolant that cools the electric motor and the inverter, and outside air; and an electric motor radiator conduit through which the coolant that cools the electric motor and the inverter flows and which is arranged either above or below the reinforcement and in front of the electric motor radiator in the longitudinal direction of the vehicle, one end of the electric motor radiator conduit being attached to the electric motor radiator.

According to this structure, when force from a collision between the vehicle and an object is applied to the reinforcement via the bumper, the energy from that force is dispersed and transferred to left and right side members of the vehicle which are able to absorb the energy from force from the front of the vehicle. As a result, the reinforcement moves toward the rear of the vehicle. At this time, the electric motor radiator conduit moves toward the rear of the vehicle together with the reinforcement, inhibiting the electric motor radiator conduit from becoming damaged.

In the vehicle according to this aspect, the coolant that cools the electric motor and the inverter may flow into the electric motor radiator through the electric motor radiator conduit.

In the vehicle according to this aspect, the one end of the electric motor radiator conduit may be connected to the front of the electric motor radiator in the longitudinal direction of the vehicle, and the coolant that cools the electric motor and the inverter may flow into the electric motor radiator through the one end.

In the vehicle according to this aspect, the bumper may have an open portion that introduces running air toward the electric motor radiator conduit.

According to this structure, the coolant can be cooled by running air before it flows into the electric motor radiator.

In the vehicle according to this aspect, the bumper may have an impact absorbing member which is arranged in front of the reinforcement in the longitudinal direction of the vehicle, and which absorbs impact from the front of the vehicle.

The vehicle according to this aspect may also include a support member which supports the internal combustion engine radiator and the electric motor radiator, and is arranged behind the reinforcement in the longitudinal direction of the vehicle. Also, the electric motor radiator conduit may be arranged in front of the support member in the longitudinal direction of the vehicle and be attached to the electric motor radiator by passing through the support member from the front in the longitudinal direction of the vehicle.

In the vehicle according to this aspect, the electric motor radiator conduit may be attached to the reinforcement.

In the vehicle according to this aspect, the electric motor radiator conduit may extend in the vehicle width direction.

In the vehicle according to this aspect, the electric motor radiator conduit may move together with the reinforcement when the reinforcement moves in the longitudinal direction of the vehicle.

In the vehicle according to this aspect, the electric motor radiator conduit may be arranged above the reinforcement.

In the vehicle according to this aspect, the electric motor radiator conduit may be made of resin.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Example embodiments of the present invention will be described in greater detail below with reference to the accompanying drawings.

Figure 1:
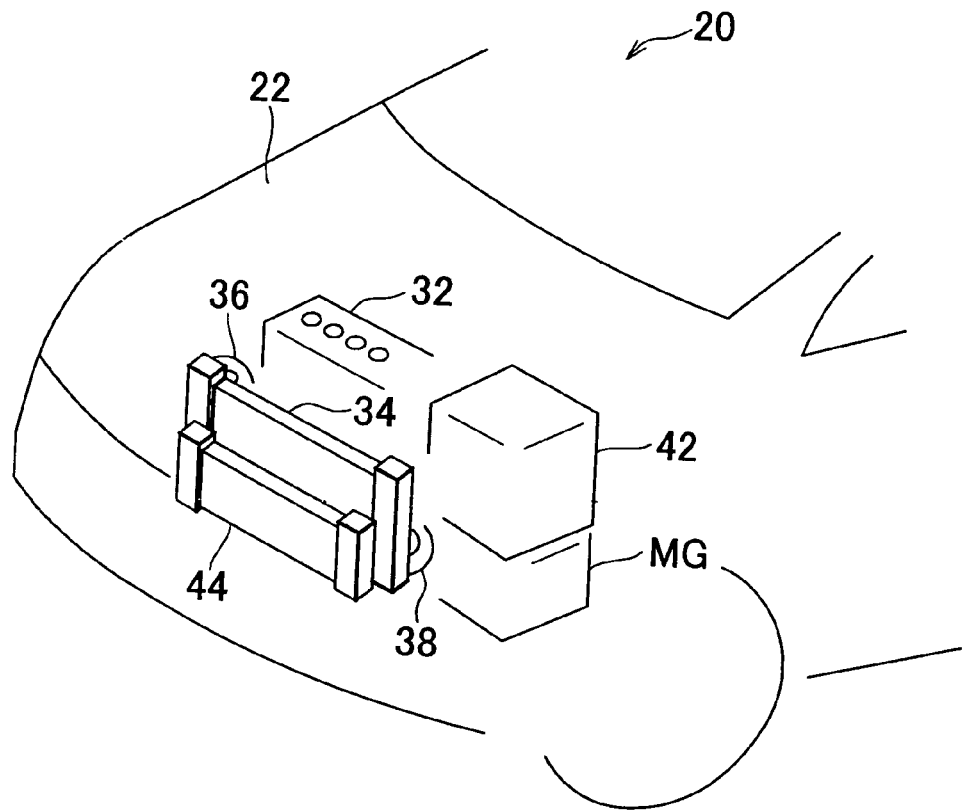
FIG. 1 is a view showing a frame format of the exterior of the front portion of a hybrid vehicle according to an example embodiment of the invention, and the arrangement of equipment necessary for the hybrid vehicle to run.

FIG. 1 is a view showing a frame format of the exterior of the front portion of a hybrid vehicle according to an example embodiment of the invention, and the arrangement of equipment necessary for the hybrid vehicle to run. As shown in the drawing, various equipment is housed in an engine compartment 22 in the front portion of the vehicle. This equipment includes an engine 32 which is an internal combustion engine that outputs power for running by burning a hydrocarbon fuel such as gasoline or light oil, a motor MG which is structured as a synchronous generator-motor and outputs power for running, an inverter 42 that includes an inverter circuit, not shown, that drives the motor MG, an engine radiator 34 that forms a cooling system of the engine 32 and performs heat exchange between antifreeze which serves as coolant that cools the engine 32 and outside air, and a hybrid radiator 44 that forms a cooling system of the inverter 42 and the motor MG and performs heat exchange between antifreeze which serves as coolant that cools the inverter 42 and the motor MG and outside air. A radiator support 26 that supports the engine radiator 34 and the hybrid radiator 44 is not shown in the drawing. Also, a battery, not shown, is mounted in the rear portion of the hybrid vehicle 20 in this example embodiment. The hybrid vehicle 20 is able to be driven by driving the motor MG using power from this battery while operating the engine 32 intermittently. This battery is able to be charged with power from the motor MG during braking.

As shown in FIG. 1, the engine radiator 34 is arranged near the front-most portion of the engine compartment 22 and in generally the center in the vehicle width direction. An inflow conduit 36 and an outflow conduit 38 are attached to the back of the engine radiator 34 from the back. The inflow conduit 36 carries coolant that has circulated through the engine 32 to the engine radiator 34, and the outflow conduit 38 carries coolant from the engine radiator 34 to the engine 32. In this example embodiment, both the inflow conduit 36 and the outflow conduit 38 are made of resin which deforms relatively easily. Also, the hybrid radiator 44 is arranged in front of the engine radiator 34, as shown in the drawing. An air-conditioning condenser, not shown, is arranged above the hybrid radiator 44 in front of the engine radiator 34. Incidentally, in this example embodiment, the cooling system of the engine 32 and the cooling system of the inverter 42 and the motor MG include independent water pumps and coolant circulation passages, as well as a common cooling fan, also not shown, which both of the cooling systems share, and the like. Coolant that has been pressurized by the water pump and circulated through the engine 32 is cooled in the engine radiator 34 by running air and cold air blown from the cooling fan, while coolant that has been pressurized by the water pump and circulated through the inverter 42 and the motor MG is cooled in the hybrid radiator 44 by running air and cold air blown from the cooling fan.

Figure 2:
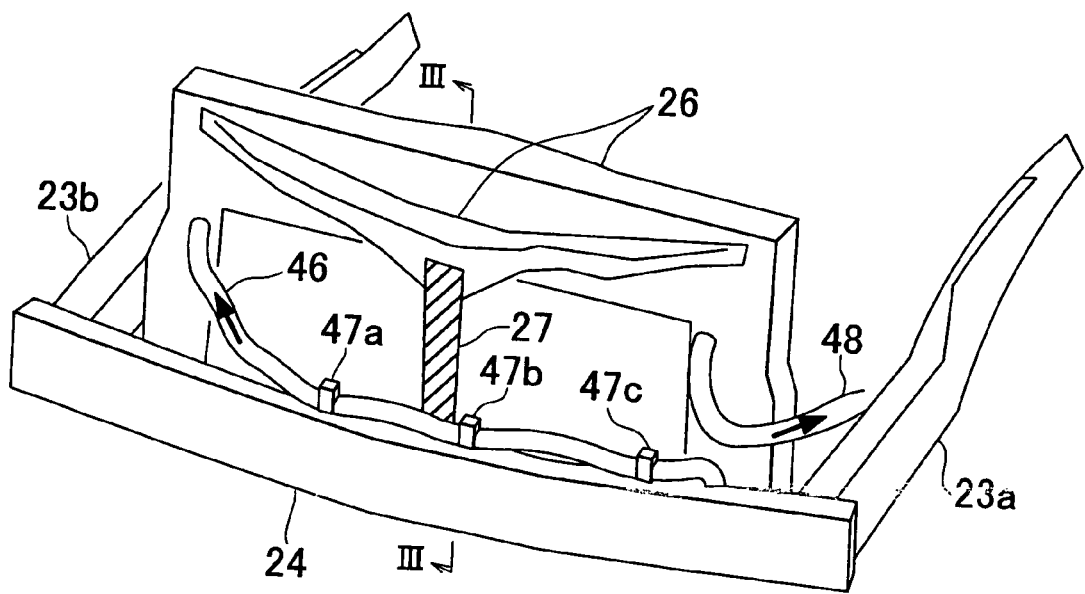
FIG. 2 is a view of part of the vehicle body structure in an engine compartment and the arrangement of an inflow conduit that is attached to a hybrid radiator according to the example embodiment of the invention, as viewed from the left front of the vehicle.

FIG. 2 is a view of part of the vehicle body structure in the engine compartment 22 and the arrangement of an inflow conduit 46 that is attached to the hybrid radiator 44, as viewed from the left front of the vehicle. The engine radiator 34 and the hybrid radiator 44 that are supported by the radiator support 26 are not shown. As shown in the drawing, left and right side members 23a and 23b and a bumper reinforcement 24 are mounted, as metal members that form part of the vehicle body, in the engine compartment 22. These side members 23a and 23b are structured so as to be able to absorb the energy from force applied from the front by the straight front end portions crumpling when force is applied from the front on the left and right sides in the engine compartment 22. The bumper reinforcement 24 (which is made of aluminum in this example embodiment) is mounted to the front ends of the left and right side members 23a and 23b at the front-most portion in the engine compartment 22. The bumper reinforcement 24 has a hollow structure which, when force is applied from the front, is capable of dispersing and transferring the energy from that force. This kind of vehicle body structure disperses and absorbs the energy from a vehicle collision (a frontal collision in particular), thereby inhibiting deformation or damage to equipment and members in the engine compartment 22 as well as a passenger compartment, not shown, located behind the engine compartment 22.

Figure 3:
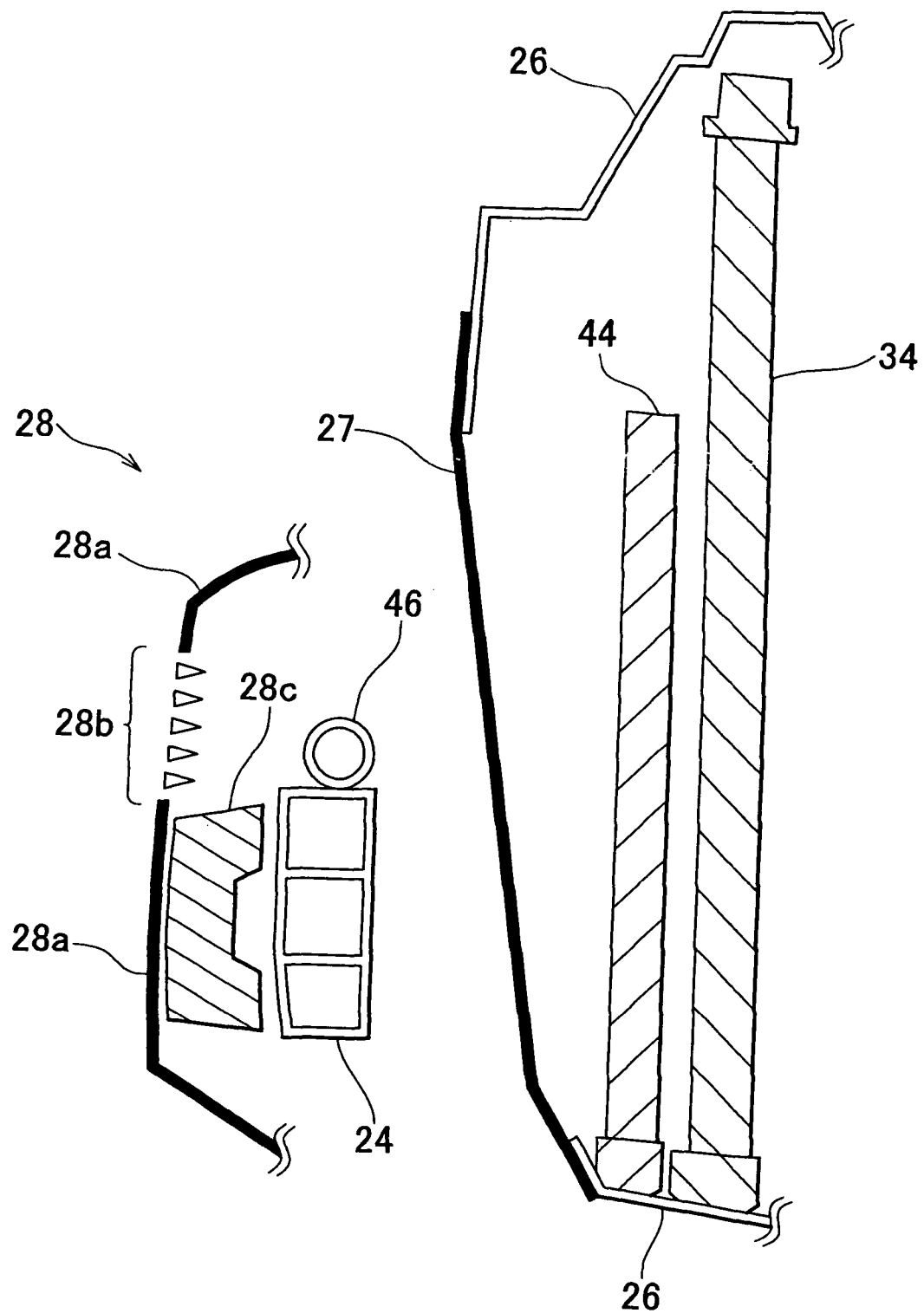
FIG. 3 is a sectional view taken along line III-III in FIG. 2, of a radiator support, a bumper reinforcement, and the inflow conduit.

In FIG. 2, the radiator support 26 is a metal member that is fixed to the vehicle body as a support member that supports both the engine radiator 34 and the hybrid radiator 44, and is arranged behind the bumper reinforcement 24. A metal center brace 27 that reinforces the radiator support 26 is mounted to the center of the front of the radiator support 26 in such a manner that the length direction of the center brace 27 is the vertical direction of the vehicle. As shown in the drawing, the inflow conduit 46 into which coolant that has circulated through the inverter 42 and the motor MG flows and the outflow conduit 48 out through which coolant flows to the motor MG side pass through a portion of the front surface of the radiator support 26 from the front side of the radiator support 26 and are attached to the front of the hybrid radiator 44. Part of the inflow conduit 46 is attached by attachments (such as plastic clips) 47a to 47c to the upper portion of the bumper reinforcement 24 so as to extend in the width direction of the vehicle. Therefore, if the bumper reinforcement 24 moves in the longitudinal direction of the vehicle, the inflow conduit 46 will move together with the bumper reinforcement 24. In this example embodiment, the inflow conduit 46 and the outflow conduit 48 are made of resin that deforms relatively easily. FIG. 3 is a sectional view taken along line III-III in FIG. 2, of the radiator support 26, the bumper reinforcement 24, and the inflow conduit 46. In FIG. 3, the engine radiator 34, the hybrid radiator 44, and a front bumper 28 that is attached to the front-most portion of the vehicle are also shown for the convenience of explanation. The front bumper 28 shown in FIG. 3 includes a resin bumper cover 28a, an open portion 28b through which running air is introduced and which is formed in the bumper cover 28a such that the length direction of the open portion 28b is in the width direction of the vehicle, and an absorption member 28c which is made of expanded polystyrene (EPS) and absorbs energy during a collision. The description below assumes that the vehicle has been involved in a collision (more specifically, a frontal collision). When force is applied to the bumper reinforcement 24 via the front bumper 28 due to a vehicle collision, energy from that force is dispersed and transferred to the left and right side members 23a and 23b, causing the bumper reinforcement 24 to move toward the rear. However, as is evident from FIGS. 2 and 3, the inflow conduit 46 through which coolant flows into the hybrid radiator 44 is arranged on the upper portion of the bumper reinforcement 24 and is attached to the front of the hybrid radiator 44 from the front. Therefore, the inflow conduit 46 also moves to the rear together with the bumper reinforcement 24. This inhibits the inflow conduit 46 from becoming damaged due to force being applied to it from a member that forms part of the vehicle body, such as the bumper reinforcement 24, pushing it into the radiator support 26 or the center brace 27. Incidentally, in this example embodiment, the inflow conduit 46 is made of resin which deforms relatively easily so when the inflow conduit 46 moves toward the rear, the portion of the inflow conduit 46 that connects to the hybrid radiator 44 will not be damaged by the reaction force. This arrangement also makes it possible to reduce the amount of space between the hybrid radiator 44 and the bumper reinforcement 24 compared with when the inflow conduit 46 is arranged between the hybrid radiator 44 and the bumper reinforcement 24. In addition, this arrangement facilitates assemblability (e.g., the ease with which equipment and members can be assembled during vehicle manufacture or maintenance) and mountability (the ease with which equipment and members can be mounted during vehicle manufacture or maintenance, and the ease with which equipment and members can be arranged in the vehicle design stage) of equipment and members in the engine compartment 22 in locations such as behind the hybrid radiator 44. Moreover, the inflow conduit 46, not the outflow conduit 48, is arranged on the upper portion of the bumper reinforcement 24 so the coolant can be cooled from running air that is introduced through the open portion 28b in the front bumper 28 before it is cooled in the hybrid radiator 44.

In the hybrid vehicle 20 in the example embodiment described above, the inflow conduit 46 through which coolant flows into the hybrid radiator 44 that is arranged in front of the engine radiator 34 is arranged on the upper portion of the bumper reinforcement 24 and is attached to the hybrid radiator 44 from the front, which inhibits the inflow conduit 46 from becoming damaged. This arrangement also enables the coolant to be cooled by running air before it is cooled in the hybrid radiator 44.

In the hybrid vehicle 20 according to this example embodiment, the inflow conduit 46 is arranged on the upper portion of the bumper reinforcement 24. Alternatively, however, the outflow conduit 48 may be arranged on the upper portion of the bumper reinforcement 24.

In the hybrid vehicle 20 according to this example embodiment, the air-conditioning condenser, not shown, is arranged above the hybrid radiator 44 in front of the engine radiator 34. Alternatively, however, the air-conditioning condenser may also be arranged below the hybrid radiator 44 in front of the engine radiator 34, or it may be integrally formed with the engine radiator 34 or the hybrid radiator 44.

In the hybrid vehicle 20 according to this example embodiment, the inflow conduit 46 and the outflow conduit 48 are attached to the front of the hybrid radiator 44 from the front, but they may also be attached to the side or top of the hybrid radiator 44 from the front.

In the hybrid vehicle 20 according to this example embodiment, the inflow conduit 36 and the outflow conduit 38 are attached to the back of the engine radiator 34 from the back, but they may also be attached to the side or the top of the engine radiator 34 from the back.

In the hybrid vehicle 20 according to the example embodiment, both the inflow conduit 46 and the outflow conduit 48 are attached to the hybrid radiator 44 from the front. Alternatively, however, the inflow conduit 46 may be attached to the hybrid radiator 44 from the front and the outflow conduit 48 may be attached to the hybrid radiator 44 from the back.

In the hybrid vehicle 20 according to this example embodiment, the engine radiator 34 and the hybrid radiator 44 that is arranged in front of the engine radiator 34 are housed in the engine compartment 22. However, a radiator other than these radiators may also be housed in the engine compartment 22. In this case, the other radiator may be arranged behind the engine radiator 34 or in front of the hybrid radiator 44.

In the hybrid vehicle 20 according to this example embodiment, the inflow conduit 36 and the outflow conduit 38 of the engine radiator 34, and the inflow conduit 46 and the outflow conduit 48 of the hybrid radiator 44 are made of resin that is able to deform relatively easily, but they may also be made of metal.

Incidentally, in this example embodiment, the engine compartment 22 is one example of a compartment, the engine 32 is one example of an internal combustion engine, the motor MG is one example of an electric motor, the engine radiator 34 is one example of an internal combustion engine radiator, the inverter 42 is one example of an inverter, the inflow conduit 36 and the outflow conduit 38 are each examples of an internal combustion engine radiator conduit, the hybrid radiator 44 is an example of an electric motor radiator, the inflow conduit 46 and the outflow conduit 48 are each examples of an electric motor radiator conduit, and the bumper reinforcement 24 is one example of a reinforcement.

In this case, the compartment is not limited to the engine compartment 22, as long as it houses an internal combustion engine, an electric motor, an internal combustion engine radiator, and an electric motor radiator in the front portion of the vehicle. The internal combustion engine is not limited to the engine 32 that outputs power by burning a hydrocarbon fuel, as long as it is a type of internal combustion engine such as a hydrogen engine. The electric motor is not limited to the motor MG that is structured as a synchronous generator-motor, as long it is a type of electric motor such as an induction motor. The internal combustion engine radiator is not limited to the engine radiator 34, as long as it performs heat exchange between coolant that cools the internal combustion engine and outside air. The inverter is not limited to the inverter 42, as long as it drives the electric motor. The internal combustion engine radiator conduit is not limited to the inflow conduit 36 and the outflow conduit 38, as long as it circulates the coolant of the internal combustion engine. The electric motor radiator is not limited to the hybrid radiator 44, as long as it performs heat exchange between coolant that cools the electric motor and the inverter that drives the electric motor, and outside air. The reinforcement is not limited to the bumper reinforcement 24, as long as it extends in the vehicle width direction behind the front bumper of the vehicle.

While some embodiments of the invention have been illustrated above, it is to be understood that the invention is not limited to the details of the illustrated embodiments, but may be embodied with various changes, modifications or improvements, which may occur to those skilled in the art, without departing from the scope of the invention.

This invention is applicable to the manufacturing industry of hybrid vehicles and the like.

The invention claimed is:

1. A hybrid vehicle comprising:
an internal combustion engine;
an electric motor;

an inverter that drives the electric motor;

a compartment portion that houses the internal combustion engine, the electric motor, and the inverter in a front portion of the vehicle;

an internal combustion engine radiator which is arranged near the front-most portion of the compartment portion and in substantially a center in the vehicle width direction, and which performs heat exchange between coolant that cools the internal combustion engine and outside air;

an internal combustion engine radiator conduit through which the coolant that cools the internal combustion engine flows and which is arranged behind the internal combustion engine radiator, the internal combustion engine radiator conduit being attached to the internal combustion engine radiator;

a bumper that is arranged at the front side of the vehicle;

a reinforcement which is mounted to front ends of left and right side members that are disposed at left and right sides of the vehicle and are able to absorb energy from force applied from ahead, wherein the reinforcement has a structure which is capable of dispersing the force applied from ahead of the vehicle and transferring the force applied from ahead of the vehicle, to the left and right side members, and which extends in the vehicle width direction behind the bumper;

an electric motor radiator which is arranged behind the reinforcement and in front of the internal combustion engine radiator in the vehicle, and which performs heat exchange between coolant that cools the electric motor and the inverter, and outside air; and an electric motor radiator conduit through which the coolant that has circulated through the electric motor and the inverter flows and which is arranged above the reinforcement and in front of the electric motor radiator, the electric motor radiator conduit being attached to the electric motor radiator.

2. The hybrid vehicle according to claim 1, wherein the electric motor radiator conduit is a conduit through which the coolant flows into the electric motor radiator.

3. The hybrid vehicle according to claim 1, wherein the bumper includes an absorption member that absorbs energy during a collision, and the absorption member is disposed in the hybrid vehicle at a position that corresponds to the reinforcement member in a height direction of the hybrid vehicle.

4. The hybrid vehicle according to claim 1, wherein the electric motor radiator conduit is attached to the reinforcement so as to extend in a width direction of the vehicle and the electric motor radiator conduit is configured to move together with the reinforcement in a longitudinal direction of the vehicle.

5. The hybrid vehicle according to claim 1, wherein the electric motor radiator conduit is made of resin.

* * * * *